United States Patent
Kwak et al.

(10) Patent No.: US 7,324,821 B2
(45) Date of Patent: Jan. 29, 2008

(54) SCHEDULING APPARATUS AND METHOD FOR DETERMINING A DESIRED NOISE RISE OVER THERMAL NOISE IN A CDMA MOBILE COMMUNICATION SYSTEM

(75) Inventors: Yong-Jun Kwak, Yongin-si (KR); Sung-Ho Choi, Seongnam-si (KR); Ju-Ho Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/701,245

(22) Filed: Nov. 4, 2003

(65) Prior Publication Data

US 2004/0165559 A1 Aug. 26, 2004

(30) Foreign Application Priority Data

Nov. 5, 2002 (KR) ............ 10-2002-0068266

(51) Int. Cl.
*H04Q 7/20* (2006.01)
*H04B 17/00* (2006.01)

(52) U.S. Cl. ............... 455/453; 455/423; 455/522; 455/67.11

(58) Field of Classification Search ........... 455/453, 455/423, 522, 67.11
See application file for complete search history.

(56) References Cited

U.S. PATENT DOCUMENTS

| 6,266,531 B1* | 7/2001 | Zadeh et al. ......... 455/453 |
| 6,295,452 B1* | 9/2001 | Choi ................ 455/436 |
| 2002/0141349 A1* | 10/2002 | Kim et al. ........... 370/252 |
| 2002/0173330 A1* | 11/2002 | Kajima et al. ........ 455/522 |
| 2002/0193118 A1* | 12/2002 | Jain et al. ........... 455/453 |
| 2005/0009518 A1* | 1/2005 | Einola et al. ......... 455/432.2 |
| 2005/0227699 A1* | 10/2005 | Schreuder et al. ..... 455/453 |

* cited by examiner

*Primary Examiner*—Lester G. Kincaid
*Assistant Examiner*—Marisol Figueroa
(74) *Attorney, Agent, or Firm*—The Farrell Law Firm, PC (57) ABSTRACT

There are disclosed an apparatus and method for determining or changing a target ROT for a target cell according to measurement ROTs from its neighbor cells in Node B controlled scheduling for improving enhanced uplink dedicated channels in an asynchronous CDMA communication system. The present invention proposes novel signaling procedures for the purpose of determining or changing the target ROT for the target cell.

12 Claims, 8 Drawing Sheets

SCHEDULING APPARATUS AND METHOD FOR DETERMINING A DESIRED NOISE RISE OVER THERMAL NOISE IN A CDMA MOBILE COMMUNICATION SYSTEM

PRIORITY

This application claims priority under 35 U.S.C. § 119 to an application entitled "Scheduling Apparatus and Method for Determining Desired Noise Rise Over Thermal Noise in a CDMA Mobile Communication System" filed in the Korean Intellectual Property Office on Nov. 5, 2002, and assigned Serial No. 2002-68266, the contents of which are incorporated herein by reference.

BACKGROUND OF THE INVENTION

1. Field of the Invention

The present invention relates generally to an apparatus and method for providing an enhanced uplink dedicated channel (EUDCH) service in an asynchronous CDMA (Code Division Multiple Access) mobile communication system, and in particular, to a scheduling apparatus and method for determining a noise rise over thermal noise (ROT) for each cell to provide an EUDCH service.

2. Description of the Related Art

The $2^{nd}$ generation mobile communication systems focusing on voice service include GSM (Global System for Mobile Communications) and IS (Interim Standard)-95. GSM was deployed in 1992, mainly in Europe, and adopts TDMA (Time Division Multiple Access) for providing service. Alternatively, Korea and the United States adopted IS-95, which uses CDMA.

Currently, mobile communication technology has evolved to $3^{rd}$ generation mobile communication systems for additionally providing data service and multimedia service at high rate with high quality. The $3^{rd}$ generation mobile communication systems refer to a mobile communication scheme that supports packet service as well as voice service in CDMA. They include 3GPP ($3^{rd}$ Generation Project Partnership, or UMTS) based on asynchronous timing between Node Bs, and 3GPP2 ($3^{rd}$ Generation Project Partnership 2, or CDMA2000) based on synchronization between base stations.

The synchronous and asynchronous $3^{rd}$ generation mobile communication systems are undergoing standardization for high-speed, high-quality wireless data packet service. As an example, the 3GPP is standardizing HSDPA (High Speed Downlink Access), and the 3GPP2 is developing standards for 1xEV-DV (Evolution-Data and Voice). The standardization work is a major example of efforts to explore a solution for providing a high-quality wireless data packet service at a high rate of 2 Mbps or above. The 3GPP further proposed EUDCH as a way of enabling high-speed packet transmission from a UE (User Equipment) to a Node B aside from high-speed packet transmission from the Node B to the UE. EUDCH attempts to improve the performance of packet transmission in the uplink communication of an asynchronous CDMA mobile communication system. The novel technology, EUDCH still uses AMC (Adaptive Modulation and Coding) and HARQ (Hybrid Automatic Retransmission Request), which were developed for HSDPA. However, a short frame having a shorter TTI (Transmission Time Interval) than TTI for HSDPA is used to transmit packets at high rate by fast reflecting uplink channel condition in EUDCH. That is, EUDCH and HSDPA differ in AMC and HARQ periods. TTI is defined as a transport unit for delivering one data block on a physical channel. For example, the TTI is 2 ms in EUDCH.

Accordingly, there is a need for scheduling uplink channels to assign resources to each cell appropriately, in addition to AMC, HARQ, and the short TTI. The uplink channel scheduling pursues efficient use of limited radio resources. For example, a target ROT (T_ROT) is determined for each cell through the uplink channel scheduling, to thereby maintain a measurement ROT (M_ROT) constant for the cell. That is, there may be a T_ROT as an optimal ROT to be maintained according to the states of a cell and its neighbor cells, and best system performance can be achieved when M_ROT as an actual ROT is prevented from exceeding T_ROT by uplink channel scheduling.

ROT is defined in Equation (1):

$$ROT = \frac{I_o}{N_o} \qquad (1)$$

where $I_o$ is the sum of all received signal strengths in a Node B, namely, the overall wide-band received power spectral density of the Node B, and $N_o$ is the thermal noise power spectral density of the Node B.

Because $N_o$ is changed little for a predetermined time, ROT is dominantly dependent on $I_o$. If ROT is small, this indicates that the strength of signals received in the Node B is weak. Although noise is small for UEs, the weak received signal limits the amount of traffic for the Node B. However, if the ROT is great, more traffic is delivered to the Node B. Unfortunately, the large ROT indicates an increased noise for the UEs. The resulting degradation of link performance leads to the degradation of the whole system performance. In view of the trade-off relationship between ROT and the whole system performance, an optimal ROT that maximizes the whole system performance must be achieved considering the traffic in the Node B and the noise strength at the UEs.

SUMMARY OF THE INVENTION

It is, therefore, an object of the present invention to provide an apparatus and method for scheduling uplink channels to improve whole system performance.

It is another object of the present invention to provide an apparatus and method for determining a target ROT based upon the amount of traffic in a Node B and noise strength at UEs in order to maximize whole system performance.

It is also another object of the present invention to provide an apparatus and method for adjusting ROTs as a criterion for Node B-controlled scheduling of enhanced uplink transport channels.

It is a further object of the present invention to provide an apparatus and method for determining a target ROT for each Node B and notifying the Node B of the target ROT in a radio network controller (RNC) responsible for managing the resources of the Node B.

It is also a further object of the present invention to provide an apparatus and method for adjusting a target ROT for a particular Node B using the target ROTs of other Node Bs in an RNC.

It still another object of the present invention to provide an apparatus and method for determining a target ROT for a cell using the present traffic of the cell and its neighbor cells to maximize system performance in an EUDCH mobile communication system.

It is yet another object of the present invention to provide an apparatus and method for signaling between an RNC and a plurality of Node Bs to schedule resources for each of the cells.

It is also yet another object of the present invention to provide an apparatus and method for providing central-concentrated control to resource scheduling for each of a plurality of Node Bs in an RNC.

The above and other objects are achieved by a method and apparatus for determining a target ROT for a target cell in a CDMA mobile communication system according to the present invention.

According to one aspect of the present invention, in a method of determining a target ROT for a target cell in an RNC in a CDMA mobile communication system where ROTs in cells measured by each of a plurality of Node Bs within the coverage area of the RNC are maintained equal to or less than target ROTs for the cells, the RNC receives a measurement ROT for the target cell from a Node B that controls the target cell, adjusts the target ROT for the target cell according to a relation between the measurement ROT and the target ROT for the target cell, and transmits the adjusted target ROT to the Node B.

According to another aspect of the present invention, in a method determining of determining a target ROT for a target cell in an RNC in a CDMA mobile communication system where ROTs in cells measured by each of a plurality of Node Bs within the coverage area of the RNC are maintained equal to or less than target ROTs for the cells, the RNC receives measurement ROTs for the target cell and cells neighboring the target cell from a Node B that controls the target cell and the neighbor cells, adjusts the target ROT for the target cell according to a relation between the measurement ROTs and the target ROTs for the target cell and the neighbor cells, and transmits the adjusted target ROT to the Node B.

According to a further aspect of the present invention, in a method of determining a target ROT for a target cell in a Node B in a CDMA mobile communication system where ROTs in cells measured by the Node B are maintained equal to or less than target ROTs for the cells, the Node B measures ROTs in the target cell and cells neighboring the target cell, and adjusts the target ROT for the target cell according to a relation between the measurement ROTs and preset target ROTs for the target cell and the neighbor cells.

According to still another aspect of the present invention, in an apparatus for determining a target ROT for a target cell in a CDMA mobile communication system where ROTs in cells measured by each of a plurality of Node Bs within the coverage area of an RNC are maintained equal to or less than target ROTs for the cells, a Node B measures ROTs in the target cell and cells neighboring the target cell within the coverage area of the Node B, transmits the measurement ROTs to the RNC, and updates the target ROT for the target cell to a target ROT adjusted by the RNC. The RNC adjusts the target ROT for the target cell according to a relation between the measurement ROTs and preset target ROTs for the target cell and the neighbor cells and transmits the adjusted target ROT to the Node B.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described in detail herein below with reference to the accompanying drawings. In the following description, well-known functions or constructions are not described in detail since they would obscure the invention in unnecessary detail.

The following description of the present invention presupposes use of enhanced uplink transport channels for EUDCH in a CDMA (CDMA) mobile communication system. As described above in connection with the conventional technology, HARQ, AMC, radio resource scheduling, and short TTI are applied to the enhanced uplink transport channel. Particularly, the present invention is described in the context of a system supporting the radio resource scheduling and the short TTI among the EUDCH techniques. The short TTI is 2 ms, which is shorter than a minimal traditional data channel TTI of 10 ms. The use of the short TTI requires a smaller data block, that is, a shorter transmission data unit. The shorter transmission data unit in turn enables faster scheduling.

1. EUDCH Scheduling

Scheduling refers to the scheduling of uplink channels that deliver EUDCH packets in the present invention. There are two types of scheduling: T_ROT maintaining scheduling in which the data rates of UEs within the same cell are determined to maintain T_ROT; and T_ROT determining scheduling in which T_ROT is determined for each cell. The conventional scheduling can be the T_ROT maintaining scheduling.

The scheduling can be considered in two ways depending on who performs the T_ROT scheduling.

First, a Node B schedules uplink channels for EUDCH as it schedules downlink channels for HSDPA. The Node B performs both the T_ROT maintaining scheduling and the T_ROT determining scheduling. Second, instead of the Node B, an RNC can schedule EUDCH uplink channels. In this case, the Node B is responsible for the T_ROT maintaining scheduling, and the RNC is responsible for the T_ROT determining scheduling.

According to which one of the above two scheduling methods is selected, only the UEs within cells under the Node B are scheduled, or the UEs within all the cells under each Node B within the RNC are scheduled. The latter scheduling is preferred because decision T_ROT for a cell considering its neighbor cells make the Node B perform the T_ROT maintaining scheduling more accurately.

1.1 T_ROT Maintaining Scheduling

The T_ROT maintaining scheduling attempts to maintain the M_ROT below the T_ROT. For the T_ROT maintaining scheduling, the Node B divides its service area as a plurality of cells and estimates the channel conditions of UEs within the cells. These UEs support EUDCH, and the estimated channel conditions can be M_ROT from each of the UEs. The Node B determines resources to be assigned to each of the UEs according to the channel conditions, for maintaining T_ROT.

The resources that the Node B schedules include time resources representing a time period for which a UE is allowed to transmit data, and ROT resources representing a data rate at which the UE transmits the data. The data rate is proportional to the ROT resources. That is, a higher data rate for a UE leads to a stronger reception power in the Node B. Thus, the ROT resources for the UE occupy more of the ROT resources available to the Node B. However, a lower data rate for the UE leads to a weaker received signal strength in the Node B reception. Therefore, the ROT resources for the UE occupy less of whole ROT resources available to the Node B. In summary, as the data rate increases, more of the ROT resources are used.

Herein below, a method of increasing whole system performance through an improved T_ROT maintaining scheduling in the Node B will be described.

Figure 1:
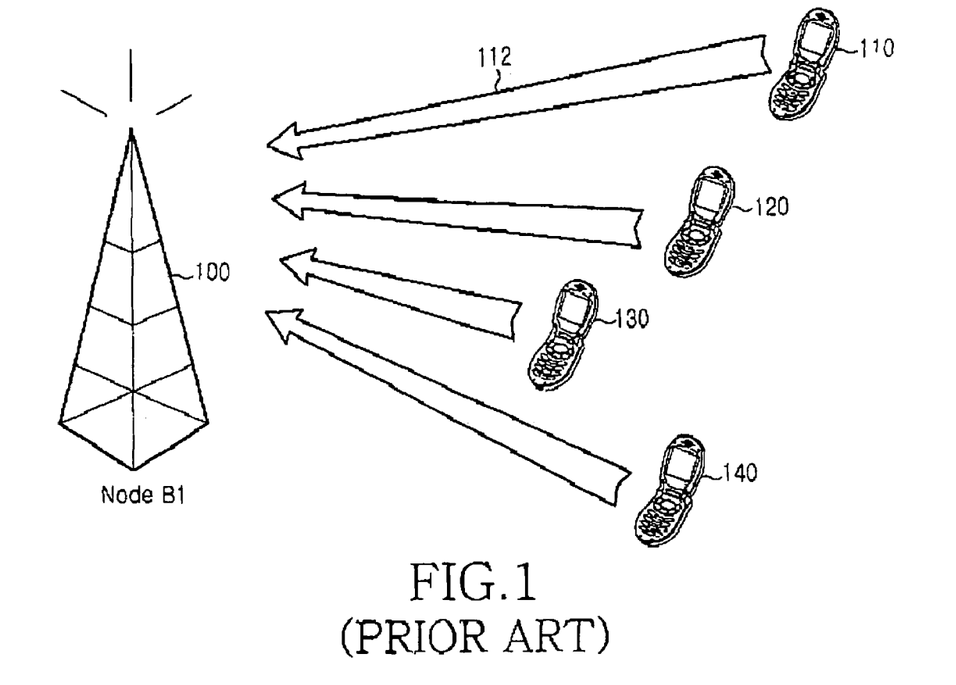
FIG. 1 is conceptual view of an asynchronous CDMA mobile communication system supporting EUDCH.

FIG. 1 is a conceptual view of EUDCH in a CDMA mobile communication system. That is, the relationship between an EUDCH Node B 100 and a plurality of UEs 110 to 140 within the same EUDCH cell is illustrated. In FIG. 1, it is assumed that one Node B corresponds to one cell.

Referring to FIG. 1, in the basic concept of EUDCH, the Node B 100 estimates the channel conditions of the UEs 110 to 140 supporting EUDCH and schedules for the UEs 110 to 140. The scheduling is to adjust the data rate of each of the UEs 110 to 140 in such a manner that M_ROT does not exceed T_ROT to improve overall system performance. To do so, T_ROT must be set appropriately. As described above, T_ROT can be determined by a Node B or an RNC. The appropriate determination of T_ROT according to the conditions of neighbor cells will be described later in more detail. However, generally, the Node B 100 assigns a low data rate for a remote UE and a high data rate for a nearby UE.

Figure 2:
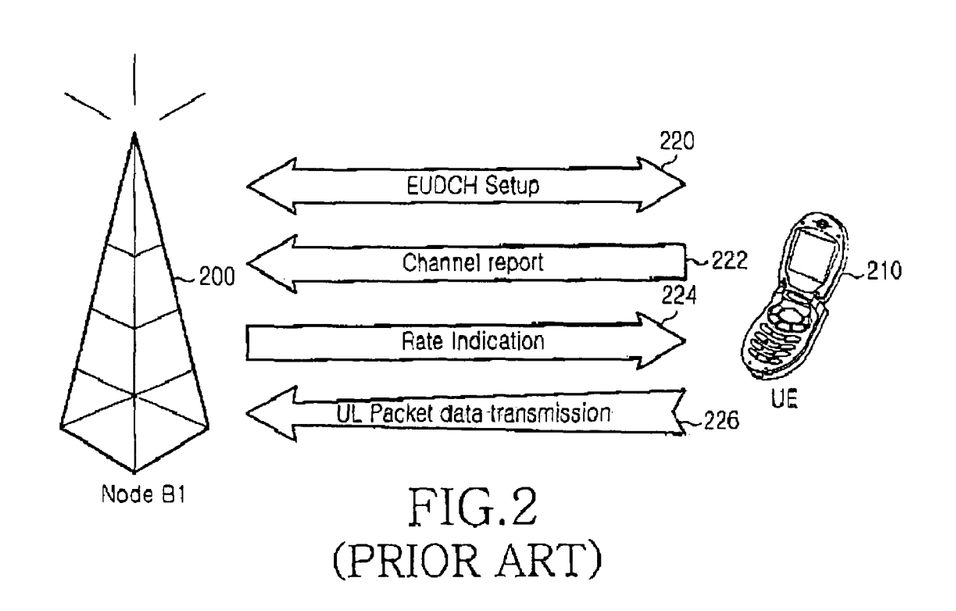
FIG. 2 illustrates conventional signaling between a Node B and a UE to support EUDCH in the asynchronous CDMA mobile communication system.

FIG. 2 illustrates signaling for a basic operation between a Node B and a UE to service EUDCH in the CDMA mobile communication system. A UE 210 is EUDCH-enabled, and a Node B 200 covers the cell of the UE 210 and provides an EUDCH service to the UE 210.

Referring to FIG. 2, an EUDCH setup is performed between the UE 210 and the Node B 200 in step 220 (EUDCH Setup). The EUDCH setup involves transmission and reception of messages on dedicated transport channels. In step 222, the UE 210 reports an uplink channel condition to the Node B (Channel Report). The uplink channel condition can be represented by the transmission power of an uplink packet channel for the EUDCH service. The Node B 200 then estimates the present uplink channel condition based on the report. For example, if the transmission power of the uplink channel is the uplink channel condition information, the Node B 200, which can measure the received power of the packet channel, estimates the present channel condition by comparing the transmission power with the received power. The Node B 200 determines a data rate for the uplink packet channel of the UE 210 based on the channel condition estimation. The Node B 200 notifies the UE 210 of the determined data rate in step 224. The UE 210 transmits packet data at the data rate in step 226 (UL Packet data Transmission). That is, the UE 210 determines a data rate for packet data based on the assigned data rate and transmits the packet data at the determined data rate to the Node B 200 in step 226.

As described above, the Node B 200 determines the data rate for the UE 210 based on the received uplink channel condition information. In this process, the Node B 200 sets appropriate data rats for a plurality of UEs supporting EUDCH. In addition, the Node B 200 determines the data rates in the manner that keeps M_ROT approximate to T_ROT. Needless to say, a higher data rate is set for a UE at a good channel condition to improve the whole system performance.

Figure 3:
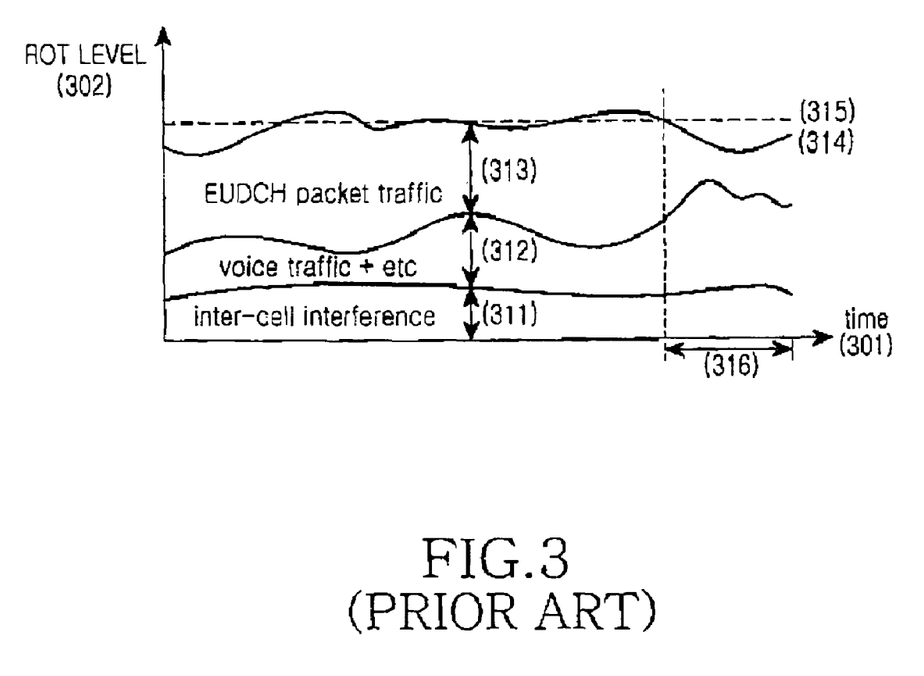
FIG. 3 is a graph illustrating a state where an ROT is kept constant through typical scheduling in a Node B supporting EUDCH.

FIG. 3 illustrates a state where M_ROT is maintained equal to or less than T_ROT in a specific cell of a Node B through T_ROT maintaining scheduling. In FIG. 3, a horizontal axis 301 represents time and a vertical axis 302 represents an ROT level.

Referring to FIG. 3, a dotted line 315 denotes T_ROT for the cell, determined by T_ROT determining scheduling. A reference numeral 311 indicates an ROT level contributed by inter-cell interference, and reference numeral 312 denotes an ROT level for voice traffic within the cell. Reference numeral 313 denotes an ROT level for EUDCH packet traffic within the cell. Reference numeral 314 denotes the change of M_ROT for the cell, measured by the Node B, with respect to time. In other words, M_ROT 314 is the sum of the ROT 311 caused by signals from UEs in neighbor cells, the ROT 312 for voice calls in UEs within the cell, and the ROT 313 for uplink packet transmission from UEs supporting EUDCH within the cell. On the assumption that T_ROT maintaining scheduling is performed fast, appropriately in the Node B, as illustrated in FIG. 3, M_ROT 314 is kept at or below T_ROT 315. However, when a small amount of data is transmitted for a time period 316, as indicated by reference numeral 314, M_ROT can be below T_ROT. Thus, M_ROT can be said to be the amount of uplink resources in current use. Therefore, as the Node B schedules downlink packet data using the whole Node B power as downlink resources in HSDPA, it schedules uplink packet data using the uplink resources, ROT in EUDCH, to thereby improve system performance.

How to perform the T_ROT maintaining scheduling efficiently, while maintaining M_ROT at a predetermined value will be described in more detail with reference to FIG. 1.

In FIG. 1, the UEs 110 to 140 supporting EUDCH differ in distance from the Node B 100. The UE 130 is nearest to the Node B 100, while the UE 110 is farthest from the Node B 100. As indicated by the length of an arrow 132, the power that the UE 130 uses for an uplink channel is the least. On the other hand, the UE 110 uses the greatest power for its uplink channel as indicated by the length of an arrow(112). Therefore, scheduling that makes power level reversely proportion to data rate results in the best performance. That is, the highest data rate is assigned to the UE 130 having the least uplink transmission power due to the shortest distance to the Node B 100, and a low data rate is assigned to the UE 110 using great uplink transmission power due to its long distance to the Node B 100. The scheduling is, needless to say, performed so that M_ROT does not exceed T_ROT.

1.2 T_ROT Determining Scheduling

The Node B schedules uplink packet channels by the above-described T_ROT maintaining scheduling so that M_ROT does not exceed T_ROT. How T_ROT is determined in an embodiment of the present invention will be described below. To determine T_ROT through the T_ROT determining scheduling in the embodiment of the present invention, information about an ROT ratio of EUDCH to voice call within a specific cell and information about uplink traffic from its neighbor cells can be used. That is, T_ROT that leads to the best performance varies according to circumstances.

1) T_ROT Determining Scheduling by RNC

When an EUDCH service is initiated, the Node B needs to know T_ROT for the T_ROT maintaining scheduling. In accordance with the embodiment of the present invention, a CRNC (Controlling RNC) having the Node B within its coverage area is responsible for determining T_ROT for each cell under the Node B. If the CRNC receives channel conditions measurements for cells under each of Node Bs under the CRNC, it may assign resources to the first cell to initiate the EUDCH service or change resources already assigned to cells according to the reported channel conditions.

System Configuration

Figure 4:
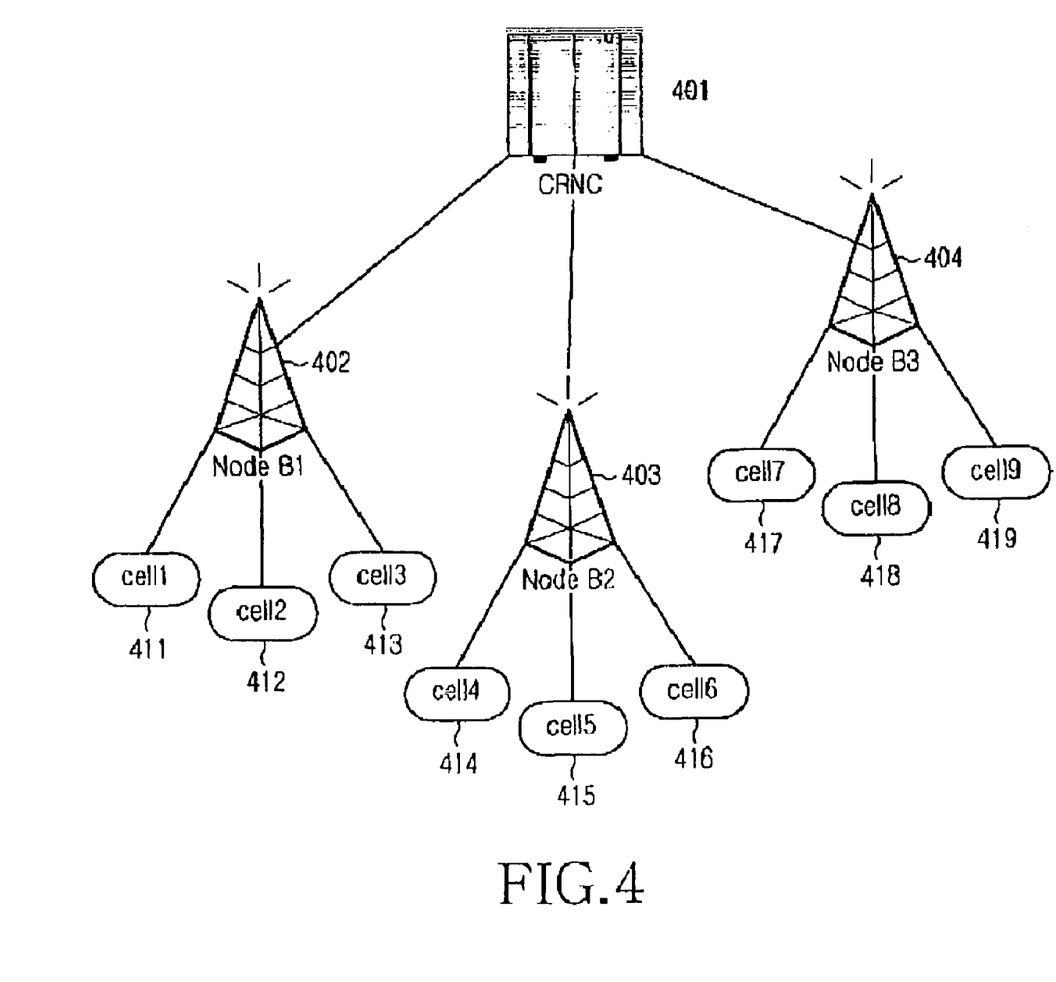
FIG. 4 is a conceptual view illustrating an asynchronous CDMA mobile communication system supporting EUDCH according to an embodiment of the present invention.

FIG. 4 is a schematic view illustrating the configuration of a CDMA mobile communication system supporting EUDCH according to an embodiment of the present invention, referred to for describing T_ROT determining scheduling in a CRNC. Referring to FIG. 4, a CRNC 401 is connected to three Node Bs 402, 403, and 404, each of which controls three cells. That is, the Node B 402 (Node B 1) controls first, second, and third cells 411, 412, and 413 (cell 1, cell 2, and cell 3), the Node B 403 (Node B 2) controls fourth, fifth, and sixth cells 414, 415, and 416 (cell 4, cell 5, and cell 6), and the Node B 404 (Node B 3) controls seventh, eighth, and ninth cells 417, 418, and 419 (cell 7, cell 8, and cell 9), as in T_ROT maintaining scheduling. Each of the Node Bs 402, 403, and 404 schedules uplink packet channels from UEs using EUDCH within a cell in the manner that renders M_ROT in the cell equal to or less than T_ROT set for the cell. For this purpose, the CRNC 401 determines T_ROT for the Node Bs 402, 403, and 404.

On the assumption that the cell 414 initiates EUDCH for a particular UE, the Node B 403 performs T_ROT maintaining scheduling for the cell 414. As indicated above, the CRNC 401 determines T_ROT needed for the Node B 403 to perform the T_ROT maintaining scheduling for the cell 414 in the embodiment of the present invention. That is, upon an EUDCH setup as illustrated in FIG. 2 in the cell 414, the CRNC 401 determines T_ROT for the cell 414 in a manner described later and notifies the Node B 403 of T_ROT by NBAP (Node B Application Part) signaling.

Signaling

Novel signaling is defined between the CRNC and the Node B to implement the inventive T_ROT determining scheduling. This signaling is divided into signaling upon EUDCH initiation and T_ROT changing signaling.

Figure 5:
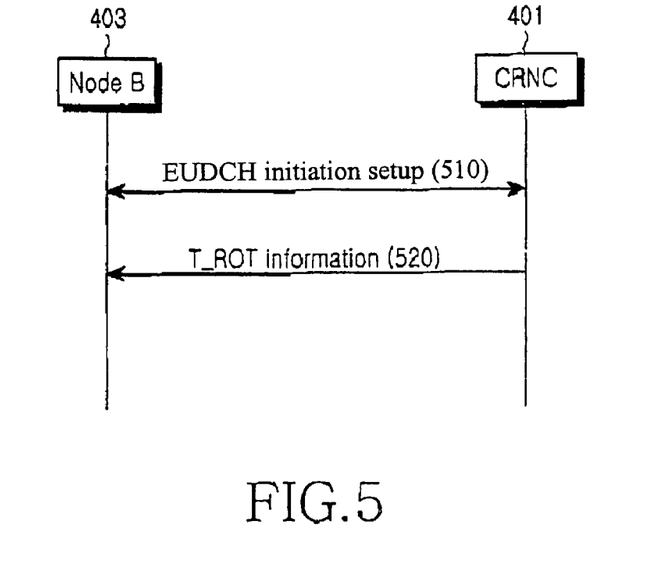
FIG. 5 is a diagram illustrating a signal flow between a Node B and an RNC upon EUDCH initiation according to the embodiment of the present invention.

FIG. 5 illustrates signaling between the CRNC and the Node B to determine new T_ROT for a particular cell when a UE within the coverage area of the cell requests an EUDCH service. In FIG. 5, the Node B controlling the cell of the UE is the Node B 403 and the RNC controlling the Node B 403 is the CRNC 401.

Referring to FIG. 5, when the UE is to initiate the EUDCH service, the Node B 403 and the CRNC 401 perform an EUDCH setup, that is, an EUDCH initialization by NBAP messages in step 510. During this EUDCH initiation setup, EUDCH parameters containing information about the UE are set. The CRNC 401 then determines T_ROT for the cell and transmits T_ROT to the Node B 403 by an NBAP message in step 520. Alternatively, the T_ROT transmission step may be incorporated in the EUDCH initiation setup in step 510.

Figure 7:
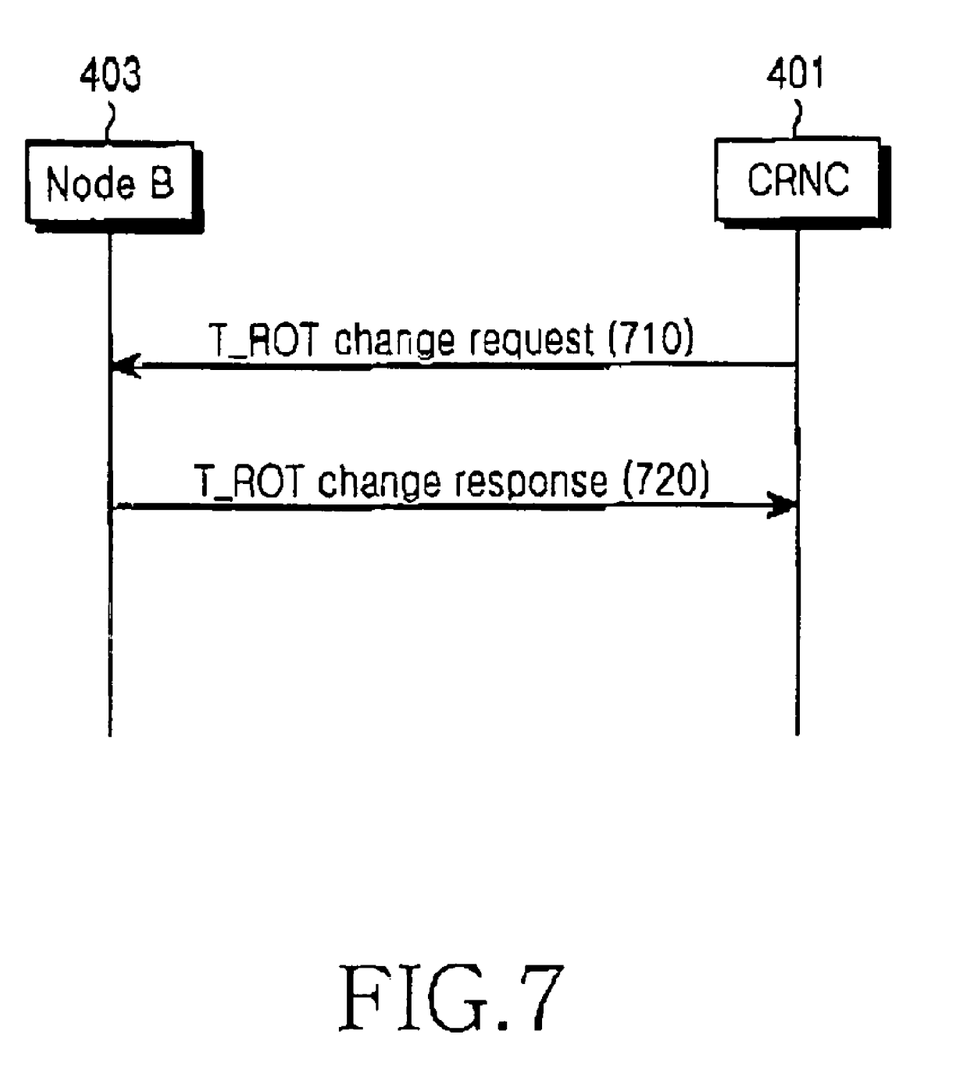
FIG. 7 is a diagram illustrating a signal flow for the RNC to notify the Node B of T_ROT for the specific cell according to the embodiment of the present invention.

FIG. 7 illustrates signaling between the CRNC and the Node B to change existing T_ROT for a particular cell during an EUDCH service. In FIG. 7, the Node B 403 controls the cell for which T_ROT is changed and the CRNC 401 is the RNC controlling the Node B 403.

Referring to FIG. 7, when the CRNC 401 determines that T_ROT for the cell under the Node B 403 is to be changed in a T_ROT determining method described later, it notifies the Node B 403 of new T_ROT by an NBAP message in step 710 (T_ROT Change Request). The NBAP message contains the new T_ROT and the ID of the cell. The Node B 403 determines a cell whose T_ROT is to be changed according to the cell ID and substitutes existing ROT for the new T_ROT for the cell. In step 720, the Node B 403 notifies the CRNC 401 of the completed T_ROT change by an NBAP message (T_ROT Change Response). Accordingly, the T_ROT changing procedure for the cell during the EUDCH service is terminated.

Determining T_ROT

T_ROT determination in the CRNC must precede the signaling upon EUDCH initiation and the T_ROT changing signaling. In addition, the CRNC needs to receive M_ROT for each cell from Node Bs to determine T_ROT for a particular cell. A description will be made below of receiving M_ROT for cells and T_ROT determining based on M_ROT in the CRNC.

As described before with reference to FIG. 2, ROT contributed by signal strengths from neighbor cells as indicated by reference numeral 311 of FIG. 3 is involved in M_ROT for a particular cell. In other words, uplink data transmission from UEs in the neighbor cells can be a factor determining M_ROT for the cell. In the present invention, the states of the cell and its neighbor cells are considered in determining T_ROT for the cell because ROT, one of resources in the cell, is related to uplink channels from UEs in the neighbor cells as well as uplink channels from UEs within the cell. To determine T_ROT for each of the cells under the CRNC, the cell needs to report uplink resource information. That is, the CRNC collects the resource information about the cells and determines T_ROT for the cells according to the resource information.

Figure 6:
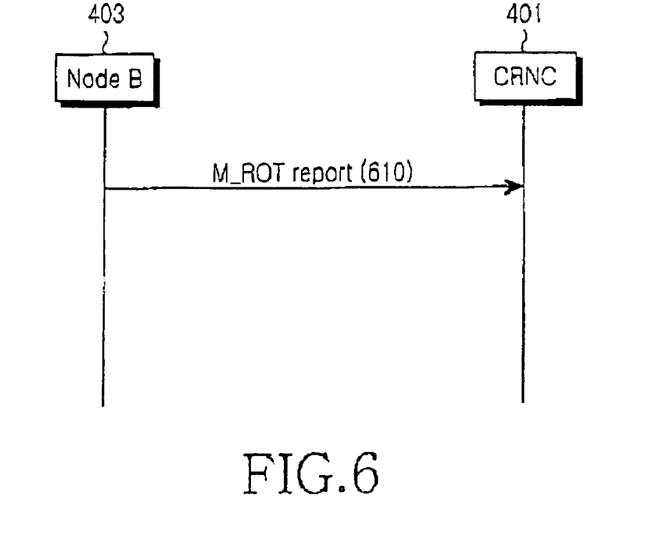
FIG. 6 is a diagram illustrating a signal flow for the Node B to report M_ROT in a specific cell to the RNC according to the embodiment of the present invention.

FIG. 6 is a diagram illustrating signaling for a Node B to report to the CRNC cell resource information required for the T_ROT determining scheduling according to the embodiment of the present invention. M_ROT measured at each cell is used as the resource information in the present invention. In FIG. 6, the Node B 403 is at least one of Node Bs that are providing the EUDCH service under the CRNC, and the CRNC 401 performs the T_ROT determining scheduling for the Node B 403.

Referring to FIG. 6, the Node B 403 measures M_ROT for each of cells under the Node B 403 and transmits M_ROTs to the CRNC 401 by an NBAP message in step 610 (M_ROT Report). The CRNC 401 obtains information (i.e. M_ROTs) about the resources of cells under the CRNC 401 and determines T_ROT for a particular cell using the M_ROTs. As described above, a Node B reports M_ROT for a particular EUDCH cell within the coverage area of the Node B to a CRNC controlling the Node B in the present invention.

The M_ROT reporting can be carried out in three ways. One is to report the M_ROTs periodically, and another is to report M_ROTs only if the M_ROTs exceed a threshold or are below the threshold. In the latter case, the M_ROT reporting occurs when M_ROT is significantly less than T_ROT due to transmission of a small amount of uplink data, or M_ROT is greater than T_ROT by a predetermined value or above due to T_ROT maintaining scheduling errors. The third way is a combination of the first and second ways. That is, the third method is a combination of periodical reporting and reporting when necessary.

The CRNC can determine the uplink conditions of the cells based on the M_ROTs. If M_ROT is substantially less than T_ROT, the CRNC determines that the amount of uplink data from a corresponding cell is small. However, if M_ROT is maintained approximately to T_ROT for a long time, the CRNC determines that in view of transmission of a large amount of uplink data, a corresponding Node B assigns uplink resources to UEs through scheduling so that M_ROT is approximate to T_ROT.

The CRNC determines new T_ROT upon EUDCH initiation or changes existing T_ROT for a particular cell according to reported resource information. How the CRNC determines T_ROT for a particular cell after receiving M_ROT for each cell will be described below. The particular cell is a cell requesting EUDCH initially, or a cell with T_ROT to be changed. In the following description, the particular cell is assumed to be the cell 414 illustrated in FIG. 4.

Referring to FIG. 4, the cell 414 is adjacent to the cells 412, 413, and 415. The CRNC 401 receives M_ROTs for the cells 411, 412, and 413 from the Node B 402, M_ROTs for the cells 414, 415, and 416 from the Node B 403, and M_ROTs for the cells 417, 418, and 419 from the Node B 404. Hence, the CRNC 401 obtains M_ROT information about the cells 412, 413, and 415 adjacent to the cell 414. The CRNC 401 determines T_ROT for the cell 414 using the M_ROT information about the neighbor cells 412, 413, and 415. This procedure will be described in more detail below.

Because the CRNC having the cell under its control knows T_ROTs in current use and M_ROTs for the cell and the neighbor cells, it adjusts T_ROT for the cell using the information in the present invention, as expressed in Equation (2):

$$ROT0_{target}(t+\tau) = F(ROT0_{measure}(t), ROT1_{measure}(t), ROT2_{measure}(t), \ldots, ROT0_{target}(t), ROT1_{target}(t), ROT2_{target}(t), \ldots) \quad (2)$$

where ROT0 represents the particular cell, ROT1, ROT 2, ... represent its neighbor cells, $ROT0_{meaure}(t)$ is reported M_ROT for the cell, $ROT1_{meaure}(t)$, $ROT2_{meaure}(t)$, ... are reported M_ROTs for the neighbor cells, $ROT0_{target}(t)$ is an existing T_ROT for the cell, and $ROT1_{target}(t)$, $ROT2_{target}(t)$, ... are existing T_ROTs for the neighbor cells. As noted from Equation (2), T_ROT for the cell at time (t+τ) is a function of T_ROTs and M_ROTs for the cell and the neighbor cells at time t.

Embodiment of T_ROT Determination

Figure 8:
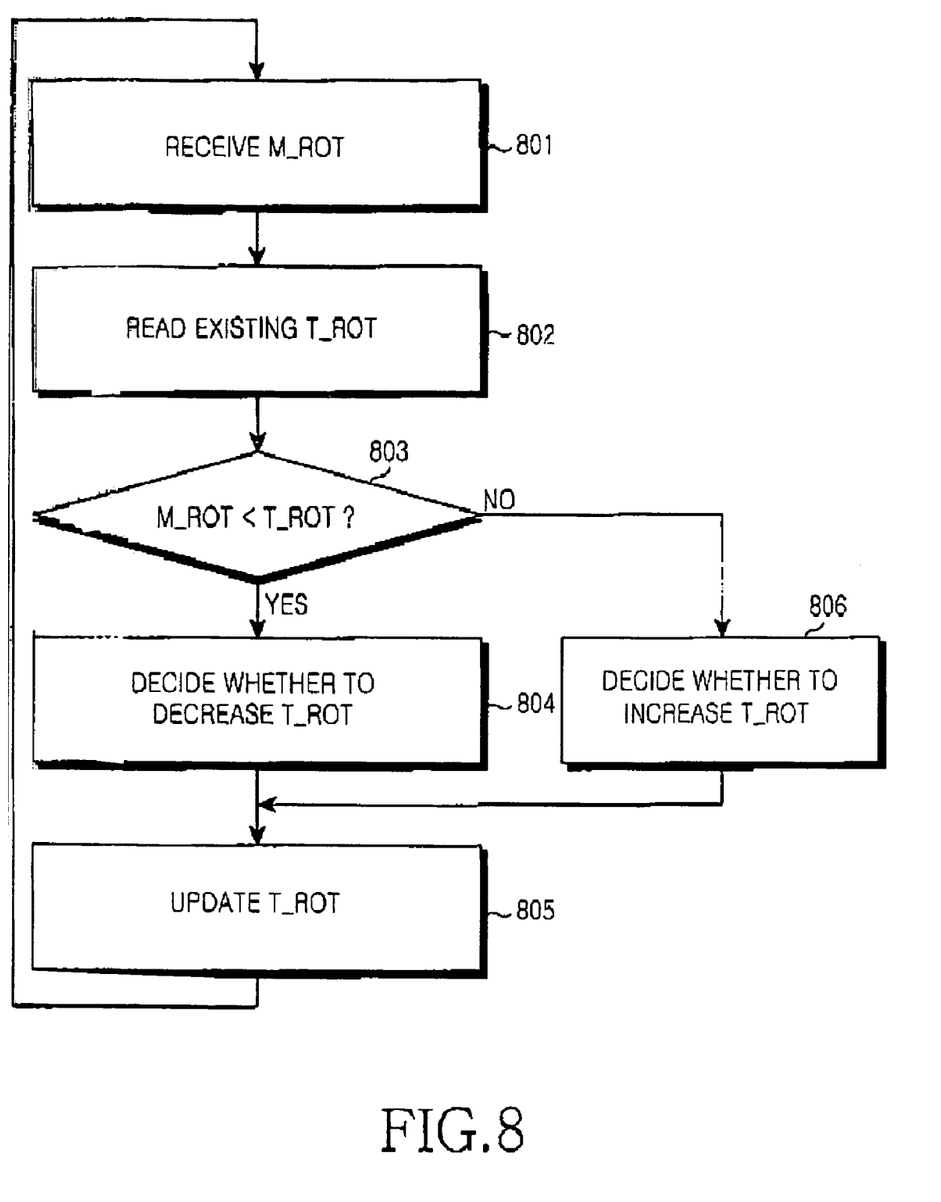
FIG. 8 is a flowchart illustrating a method of determining T_ROT for the specific cell according to the embodiment of the present invention.

With reference to FIG. 8, an embodiment of a method of determining or changing T_ROT for a particular cell in the CRNC will be described. More specifically, FIG. 8 depicts an algorithm of determining whether T_ROT for the particular cell is to be changed.

Referring to FIG. 8, the CRNC receives M_ROTs for cells from EUDCH Node Bs in step 801. The cells include a target cell of which T_ROT is to be changed and its neighbor cells. The CRNC has existing T_ROTs for the cells in a memory. In step 802, the CRNC reads the T_ROTs from the memory. The CRNC compares M_ROT with T_ROT for the cell in step 803. If M_ROT is less than T_ROT, which implies that a basic condition for reducing T_ROT is satisfied, the CRNC determines whether T_ROT for the target cell is to be decreased using the M_ROTs and T_ROTs for the target cell and neighbor cells in step 804. If M_ROT is equal to or greater than T_ROT, which implies that a basic condition for increasing T_ROT is satisfied, the CRNC determines whether T_ROT for the target cell is to be increased using the M_ROTs and T_ROTs for the target cell and neighbor cells in step 806. According to the determination result in step 804 or 806, the CRNC increase, decreases, or maintains the existing T_ROT for the target cell in step 805.

Figure 9:
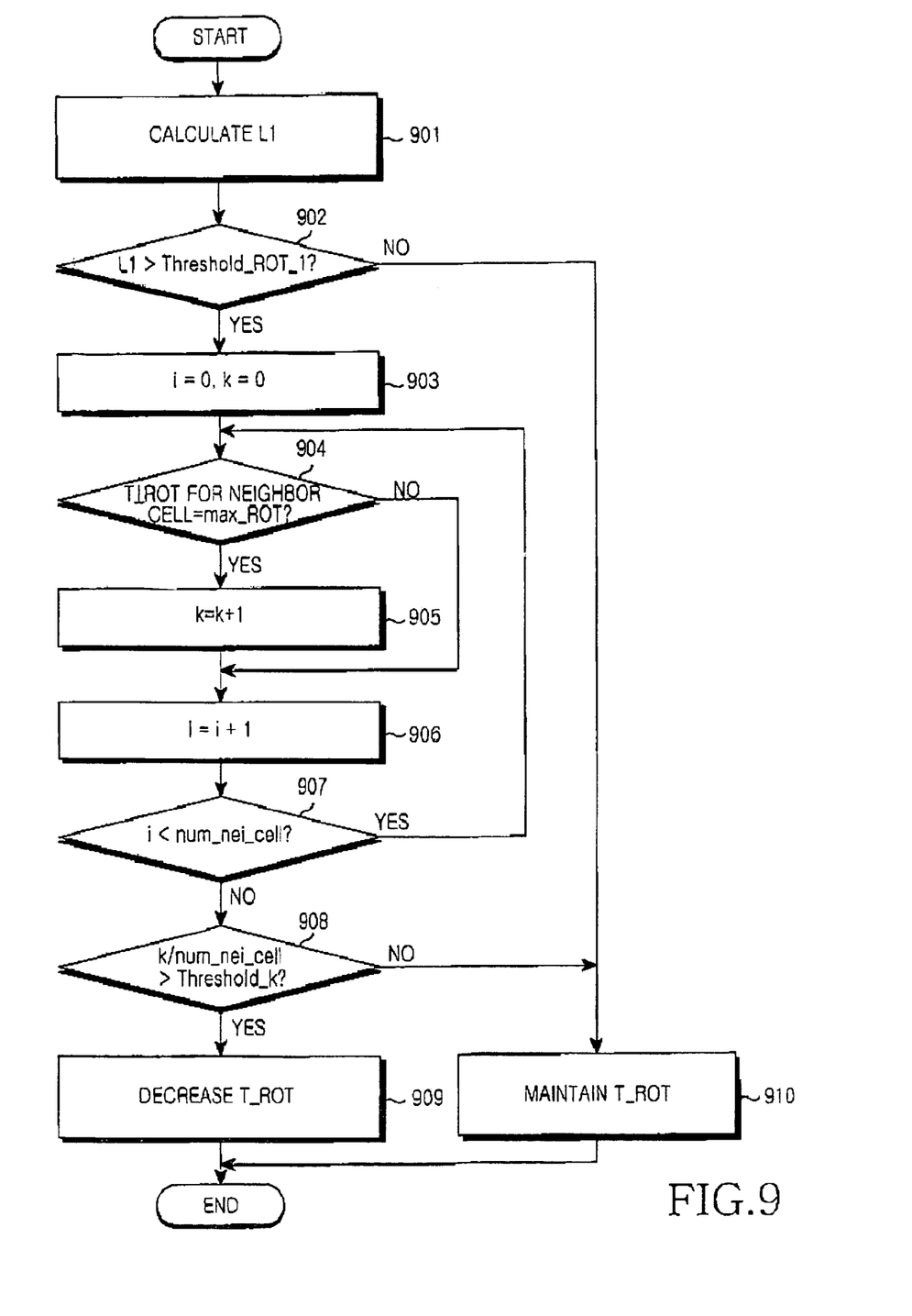
FIG. 9 is a flowchart illustrating a method of determining to decrease T_ROT for the specific cell according to the embodiment of the present invention.
Figure 10:
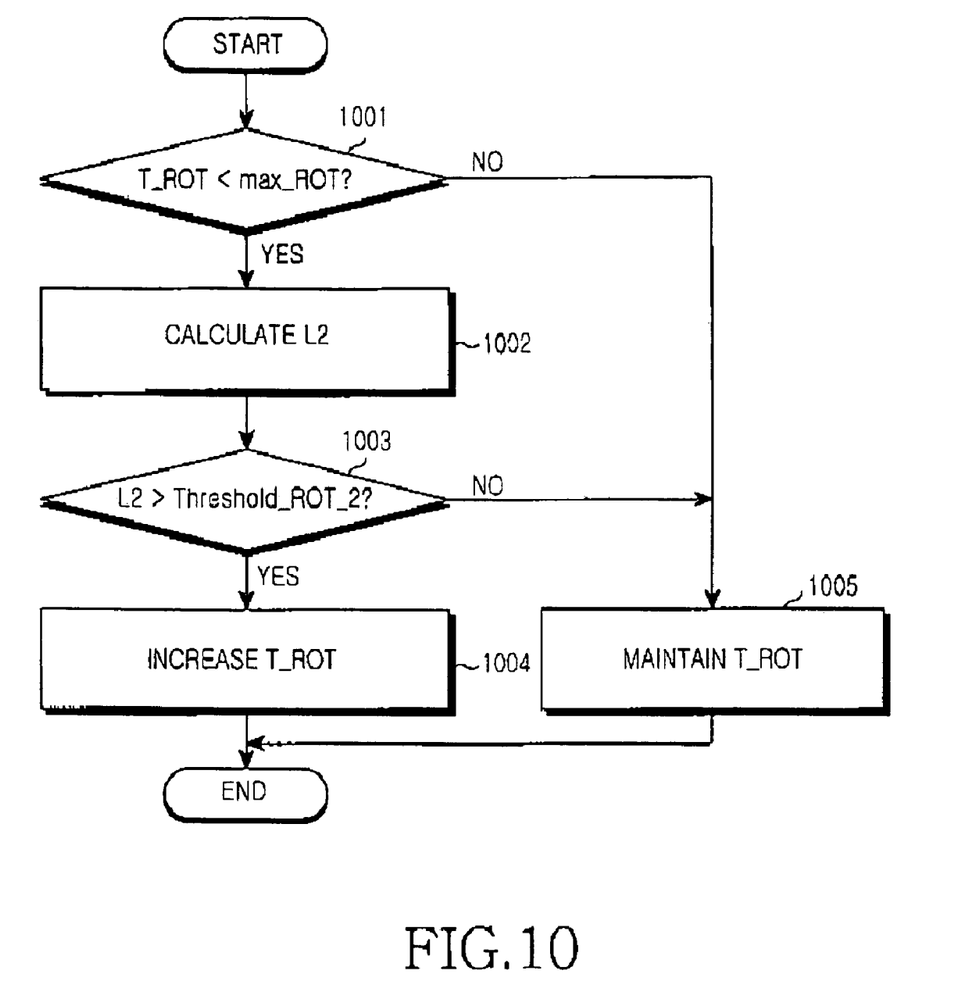
FIG. 10 is a flowchart illustrating a method of determining to increase T_ROT for the specific cell according to the embodiment of the present invention.

The determination in steps 804 and 806 can be performed in various ways. FIG. 9 is a flowchart illustrating a control operation for a method of performing step 804 and FIG. 10 is a flowchart illustrating a control operation for a method of performing step 806.

Referring to FIG. 9, the CRNC calculates a period L1 for which M_ROT is maintained less than T_ROT in the target cell in step 901. L1 is a parameter for verifying reduction of T_ROT. If the state where M_ROT is less than T_ROT lasts for L1, the CRNC decreases T_ROT for the target cell.

In step 902, the CRNC compares L1 with a threshold, threshold_ROT_1. If L1 is greater than threshold_ROT_1, that is, the period of M_ROT being less than T_ROT lasts substantially, the CRNC is more likely to decrease T_ROT for the target cell. However, if L1 is not greater than threshold_ROT_1, the CRNC maintains T_ROT in step 910.

The CRNC reduces T_ROT for the target cell by considering T_ROT for neighbor cells in steps 903 to 908. The CRNC sets i and k as 0 in step 903, wherein the i indicates a count value for counting the neighbor cells. The CRNC compares T_ROT in an $1^{th}$ neighbor cell with a maximum available ROT, max_ROT in step 904. If T_ROT in the i th neighbor cells is equal to max_ROT, that is, uplink data traffic from the i th neighbor cell is great, the CRNC increases a variable k, which indicates the number of neighbor cells satisfying the condition of step 904, in step 905. The CRNC increases a variable i in step 906. The CRNC compares i with the number of neighbor cells (num_nei_cell) in step 907.

However, if i is less than the number of neighbor cells (num_nei_cell), the CRNC returns to step 904. However, if i is not less than the number of neighbor cells (num_nei_cell), the CRNC proceeds to step 908.

When the loop has run as many times as the number of the neighbor cells (num_nei_cell). The CRNC compares $$\frac{k}{numberofneibourcells}$$

with a predetermined threshold, threshold_k in step 908. The $$\frac{k}{numberofneibourcells}$$

is a ratio of k to the number of the neighbor cells. If $$\frac{k}{numberofneibourcells}$$

is greater than threshold_k, the CRNC reduces T_ROT for the particular cell by a predetermined value in step 909. However, if $$\frac{k}{numberofneibourcells}$$

is less than or equal to threshold_k, the CRNC maintains T_ROT for the target cell in step 910

Referring to FIG. 10, the CRNC compares T_ROT in the target cell with max_ROT in step 1001. If T_ROT is less than max_ROT, T_ROT is likely to be increased for the target cell and then the procedure goes to step 1002. However, if T_ROT is not less than max_ROT, the CRNC maintains T_ROT for the target cell in step 1005.

In step 1002, the CRNC calculates a period L2 for which M_ROT is maintained greater than T_ROT in the target cell. L2 is a parameter with which to verify an increase of T_ROT for the target cell. If M_ROT is maintained greater than T_ROT in the target cell for L2, the CRNC may increase T_ROT for the target cell.

In step 1003, the CRNC compares L2 with a predetermined threshold, threshold_ROT_2. If L2 is greater than threshold_ROT_2, that is, the state where M_ROT is greater than or equal to T_ROT lasts for a substantially long time, the CRNC increases T_ROT for the target cell by a predetermined value in step 1004. However, if L2 is less than or equal to threshold_ROT_2, the CRNC maintains T_ROT for the target cell in step 1005. That is, the CRNC increases, decreases, or maintains T_ROT for the target cell depending on whether the condition of step 1003 is satisfied or not.

An embodiment of the method of changing T_ROT for a target cell using M_ROTs and existing T_ROTs from the neighbor cell and its neighbor cells in the CRNC has been described above in connection with FIGS. 8, 9, and 10. Aside from the above algorithm, a CRNC may adopt an algorithm of changing T_ROT for the target cell using the M_ROTs and T_ROTs from the target cell and the neighbor cells as variables as shown in Equation (2).

2) T_ROT Determining Scheduling by Node B

While the CRNC is responsible for T_ROT determining scheduling in the embodiment of the present invention, it can be further contemplated as another embodiment that a Node B performs the T_ROT determining scheduling. In the second embodiment of the present invention, the signaling procedures between the Node B and the CRNC illustrated in FIGS. 5, 6, and 7 are not performed, while the control operations illustrated in FIGS. 8, 9, and 10 are used in the same manner. However, as T_ROT is determined considering interference only from cells within the Node B, the T_ROT determining, scheduling by the Node B is not as efficient as the T_ROT determining scheduling by the CRNC.

In accordance with the present invention as described above, a Node B reports M_ROTs in cells under the Node B to a CRNC, and the CRNC determines T_ROT for a target cell among the cells using the M_ROTs. The CRNC sets a new T_ROT for the target cell when EUDCH is initiated, or changes the existing T_ROT when necessary during EUDCH. The adaptive T_ROT setting according to circumstances improves the performance of an EUDCH system.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of determining a target noise rise over thermal noise (ROT) for a target cell in a radio network controller (RNC) in a CDMA (Code Division Multiple Access) mobile communication system where ROTs in cells measured by each of a plurality of Node Bs within a coverage area of the RNC are maintained equal to or less than target ROTs for the cells, the method comprising the steps of:

receiving at the RNC a measurement ROT for the target cell from a Node B that controls the target cell;

receiving at the RNC at least one measurement ROT for at least one neighboring cell from each of the Node Bs that controls the neighboring cell;

adjusting the target ROT for the target cell at the RNC according to a relation between the measurement ROT for the target cell, the target ROT for the target cell and the at least one measurement ROT for the at least one neighboring cell; and transmitting the adjusted target ROT from the RNC to the Node B.

2. The method of claim 1, wherein the measurement ROT in the target cell is received periodically.

3. The method of claim 1, wherein the measurement ROT in the target cell is received when the measurement ROT is one of less than and greater than the target ROT by a predetermined threshold.

4. The method of claim 1, wherein the measurement ROT in the target cell is received periodically, and when the measurement ROT is one of less than and greater than the target ROT by a predetermined threshold.

5. The method of claim 1, wherein the measurement ROT is received from the Node B and the adjusted target ROT is transmitted to the Node B using Node B application part signaling messages.

6. The method of claim 1, wherein if the measurement ROT is maintained less than the target ROT in the target cell for a predetermined time, the RNC decreases the target ROT, and if the measurement ROT is maintained equal to or greater than the target ROT in the target cell for the predetermined time, the RNC increases the target ROT.

7. An apparatus for determining a target noise rise over thermal noise (ROT) for a target cell in a CDMA (Code Division Multiple Access) mobile communication system where ROTs in cells measured by each of a plurality of Node Bs are maintained equal to or less than target ROTs for the cells, the apparatus comprising:
- a Node B for measuring ROTs in the target cell and cells neighboring the target cell within a coverage area of the Node B, transmitting the ROTs, and updating the target ROT for the target cell to an adjusted target ROT; and
- a radio network controller (RNC) for receiving the ROTs, adjusting the target ROT for the target cell according to a relation between the ROTs and preset target ROT for the target cell, and transmitting the adjusted target ROT to the Node B.

8. The apparatus of claim 7, wherein the Node B transmits the ROTs periodically to the RNC.

9. The apparatus of claim 7, wherein the Node B transmits the ROTs to the RNC if the ROTs are one of less than and greater than the target ROTs by a predetermined threshold.

10. The apparatus of claim 7, wherein the Node B transmits the ROTs to the RNC periodically, and when the ROTs are one less than and greater than the target ROT by a predetermined threshold.

11. The apparatus of 7, wherein the Node B transmits the ROTs to the RNC and the RNC transmits the adjusted target ROT to the Node B using Node B application part signaling messages.

12. The apparatus of claim 7, wherein if the ROT is maintained less than the target ROT in the target cell for a predetermined time, the RNC decreases the target ROT, and if the ROT is maintained equal to or greater than the target ROT in the target cell for the predetermined time, the RNC increases the target ROT.

* * * * *